Sept. 17, 1957      T. J. DIETZ      2,806,255
PROCESS OF MAKING AN EXPANDED CELLULAR PRODUCT
Filed May 5, 1954
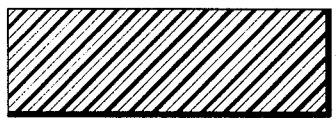
*Cellular product of :*
*70/30 styrene butadiene copolymer 99% by wt.*
*dinitrosopentamethylenetetramine    1% by wt.*
*(blowing agent)*
INVENTOR
Thomas J. Dietz
BY Leech + Radue
ATTORNEYS

United States Patent Office 2,806,255
Patented Sept. 17, 1957

2,806,255

PROCESS OF MAKING AN EXPANDED CELLULAR PRODUCT

Thomas J. Dietz, Chester Heights, Pa., assignor, by mesne assignments, to the United States of America as represented by the United States Atomic Energy Commission Application May 5, 1954, Serial No. 427,797

3 Claims. (Cl. 18—48)

The present invention relates to a blown, rigid cellular product of a copolymer of styrene and butadiene, and to a process for making the same.

It is the object of this invention to provide a product of the character and composition indicated having a specific gravity in the range of 0.2 to 0.9 and a compressive strength in the range of 200 to 2,000 p. s. i.

A further object of this invention is to provide a process for making a cellular product from a resinous copolymer of styrene and butadiene utilizing a nitrogen-producing chemical blowing agent decomposing at substantially the minimum fluxing temperature of the copolymer, in which a finely divided mixture of the copolymer and the chemical blowing agent is softened by confined working together under pressure to produce internal heat sufficient to activate the blowing agent and release nitrogen therefrom, and directly thereafter expanding the thus heated composition into a cellular structure by sudden release from confinement.

A more specific object of this invention resides in the making of a strong, rigid, closed cell product of the character indicated, which is free from brittleness and may be readily worked with simple tools, and bonded firmly with like pieces when desired.

The expanded, closed cell, product of this invention in preferred form constitutes an improvement over that previously available by reason of being stronger and stiffer, with a cell structure so fine that a microscope is needed to discern the individual cells. The specific gravity and the cell size may be determined by the amount of blowing agent employed and the extent to which expansion is limited. Products with interconnected cells are also possible.

The foregoing and other particulars of the practice of this invention will be more fully apparent from the following detailed description of a preferred embodiment and several other examples.

The sole figure of the drawing represents a cross section of a rectangular product of preferred composition.

Resinous high polymers which soften at temperatures in excess of 200° F. and most frequently in excess of 250° F. can be expanded by use of the common nitrogen-producing blowing agents to produce compositions having preselected specific gravities.

The resinous high polymer is usually obtained in the form of fine granules or a powder, although the coarseness of this material is not a critical matter. The powdered resin is dry mixed with the necessary amount of a nitrogen-producing chemical blowing agent, such for example as dinitrosopentamethylenetetramine, obtainable from commercial sources.

This dry mixture is heated and fluxed quickly under pressure at a sufficient temperature to activate the blowing agent. Upon sudden release of the pressure on the fluxed composition, the mass expands as required and to the extent permitted.

One convenient way of accomplishing the required mixing and fluxing is by use of a plastic extruder having a long barrel and a tapered screw with a shallow thread. A Farell-Birmingham 2-inch plastics extruder of commercial type has been used satisfactorily for this purpose.

It is also possible to obtain the expanded composition in molded form by using a conventional injection molding machine. In this case the molding powder is the same as was used for extrusion, and includes the necessary blowing agent. Barrel temperatures are controlled so that the blowing agent is activated as the fluxed composition passes the torpedo or the zone of most efficient heating. The injection charge is metered in order that the pressure developed on the molded piece will not be sufficient to compact it to such an extent that the cells formed during expansion are destroyed.

The following tabulated examples show the compositions involved, extruder temperatures, and physical properties of the products obtained.

*Examples*

| Ingredients | Compounds | | |
|---|---|---|---|
| | #57 C-730 | #59 C-730 | #70 C-730 |
| 70/30 styrene butadiene copolymer | 99.0 | 99.0 | 99.0 |
| dinitrosopentamethylenetetramine | 1.0 | 1.0 | 1.0 |
| Extruder Temperatures, ° F.: | | | |
| Screw | 225 | (1) | (1) |
| Stage #2 | (2) | (2) | (3) |
| Stage #3 | (3) | (2) | (2) |
| Stage #4 | 225 | 220 | 220 |
| Stage #5 | 225 | 220 | 220 |
| Stage #6 | 225 | 220 | 220 |
| Head | 275 | 265 | 265 |
| Die | 275 | 260 | 260 |
| Stock | 290 | 280 | 272 |
| Physical Properties: | | | |
| Specific Gravity | 0.375 | 0.420 | 0.570 |
| Flexural strength, p. s. i. | | 1,290 | 2,860 |
| Flexural modulus, p. s. i. | | 52,900 | 104,000 |
| Compressive strength, p. s. i. | 750 | 870 | 1,650 |
| Compressive modulus, p. s. i. | 28,400 | 34,600 | 61,000 |
| Dielectric Constant, 1.0 Mc | 1.61 | 1.57 | 1.84 |
| Dielectric Constant, 10 Mc | 1.57 | 1.57 | 1.83 |
| Dielectric Constant, 100 Mc | 1.55 | 1.56 | 1.82 |
| Loss Factor, 1.0 Mc | 0.0030 | 0.0030 | 0.0043 |
| Loss Factor, 10 Mc | 0.0036 | 0.0029 | 0.0034 |
| Loss Factor, 100 Mc | 0.0048 | 0.0020 | 0.0030 |

[1] Effluent to 160° F. and then shut off.
[2] Temperature allowed to float.
[3] Water cooled to insure against bridging at hopper.

The styrene butadiene copolymer of the above examples was that supplied commercially by Dewey and Almy, and bearing the designation "Darex X-34"; and the blowing agent, dinitrosopentamethylenetetramine, was that supplied by the Du Pont Company and bearing the designation "Unicel ND."

It is to be noted that the stock developed its own temperature by internal friction while passing through the extruder. The stock temperature being in excess of any part of the extruder, the heating of the stock is independent of conduction of heat from outside. The process as thus conducted results in the stock reaching blowing temperature uniformly and at the desired instant. The action of the blowing agent is exothermic. The output of the extruder is adjusted so that the stock blows just as it emerges from the die.

The cellular product will contain nitrogen and the non-gaseous residue of the nitrogen-producing chemical blowing agent.

The blowing stock emerging from the extruder die may be readily restrained and postformed. In practice a series of wood molds or clamps has been applied to the stock as it was extruded and expanded. The cooling was sufficiently rapid to permit continuous operation by progressively rearranging the individual pressure clamps. The mold skin formed may be removed by machining.

A simple and relatively cheap commercial method of preforming the rigid cellular product into bar stock, therefore, appears entirely feasible.

The composition used in producing the novel product of this invention has the economical advantage of permitting re-use of clean trimmings, scrap and reject materials. These may be reprocessed satisfactorily when ground and mixed with additional blowing agent.

A number of useful products may be obtained with other copolymers of styrene and butadiene coming within the ranges of 50% to 95% by weight styrene and 50% to 5% by weight butadiene, and including from 0.5% to 10% by weight of dinitrosopentamethylenetetramine or equivalent nitrogen-producing chemical blowing agent.

In addition to the advantageous combination of structural and physical properties possessed by the rigid, expanded cellular product of preferred composition, it has been found that in bar stock form the product can be machined in conventional metal and woodworking equipment, and cemented together by rubber cements, solvents such as toluene, or a pyroxylin cement. Postforming of finished stock having a thickness of the order of one-quarter inch around a radius of twelve inches can be accomplished by heating to 250° F., with cooling permitted to take place on the shaping form.

Having thus described my invention and the preferred manner of practicing the same, what I claim as novel and desire to secure by Letters Patent of the United States is:

1. A process for making an expanded cellular product which includes, providing a resinous mixture comprising a finely divided copolymer of styrene and butadiene and from 0.5 to 10% by weight of nitrogen-producing chemical blowing agent, softening said mixture by confined working under pressure to produce internal heat sufficient to release the nitrogen from the blowing agent, and expanding the thus heated mixture into a cellular structure by sudden release from confinement substantially simultaneous with the release of nitrogen from the blowing agent.

2. A continuous process for making a rigid, cellular product which includes, providing a resinous mixture comprising a finely divided copolymer of styrene and butadiene and from 0.5 to 10% by weight of dinitrosopentamethylenetetramine, fluxing said mixture by confined working under pressure to produce internal heat sufficient to release the nitrogen from the dinitrosopentamethylenetetramine, and substantially simultaneous with the release of nitrogen from the blowing agent progressively discharging and expanding the thus heated mixture into a cellular structure as it is thus released from confinement.

3. The process of claim 2 in which the discharging cellular structure is postformed by applying molding pressure thereto as it cools.

References Cited in the file of this patent

UNITED STATES PATENTS

| | | |
|---|---|---|
| 2,442,368 | Maynard | June 1, 1948 |
| 2,632,210 | Olson et al. | Mar. 24, 1953 |
| 2,666,751 | Wonderly | Jan. 19, 1954 |
| 2,683,696 | Muller et al. | July 13, 1954 |